A. E. WOLCOTT.
Carriage Spring.

No. 90,145.

Patented May 18, 1869.

United States Patent Office.

ALLYN E. WOLCOTT, OF CHICAGO, ILLINOIS, ASSIGNOR TO HIMSELF AND ISAAC SIMMONS, OF BALTIMORE, MARYLAND.

*Letters Patent No. 90,145, dated May 18, 1869.*

IMPROVEMENT IN CARRIAGE-SPRINGS.

The Schedule referred to in these Letters Patent and making part of the same.

*To all whom it may concern:*

Be it known that I, ALLYN E. WOLCOTT, of Chicago, in the county of Cook, and State of Illinois, have invented a new and useful Improvement in Metallic Springs; and I do hereby declare the following to be a full, clear, and exact description of the same, reference being had to the accompanying drawings, and the letters and figures marked thereon, which form a part of this specification, and in which—

Figure 1:
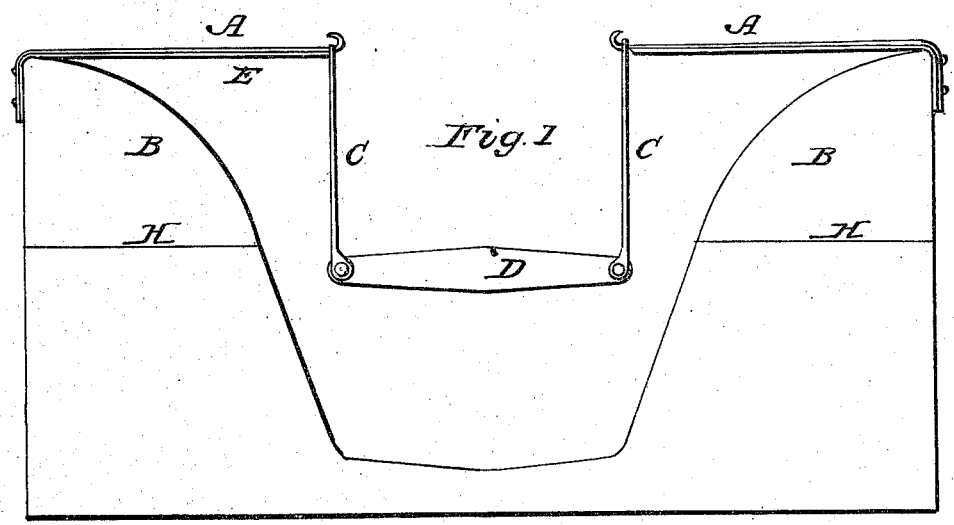

Figure 1 represents a side elevation of my improved spring, and

Figure 2:
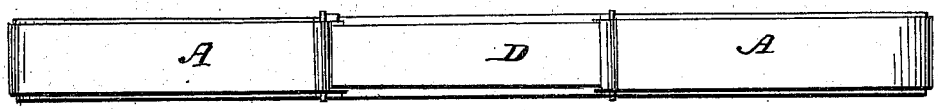

Figure 2, a top or plan view.

The nature of my invention consists in the combination of a suspended connecting-piece, adjusting-links, metallic springs, and curved bearings.

To enable those skilled in the art to understand how to manufacture and use my invention, I will proceed to describe the same with particularity.

The same letters of reference refer to the corresponding parts in the different figures.

In the annexed drawings—

A A represent two straight metallic resilient plates or springs, and

B, curved bearings for the springs to rest upon as they are sprung down by the weight.

The springs and these bearings are fully described in my application for a patent for an improvement in metallic springs, of even date herewith.

From the ends of the springs A are suspended the adjusting-links C, the lower ends of which are connected by the connecting-beam D.

This form of my improved spring is a change in its application to adapt it to suspended weights, or where it is desirable to have the weights below the curved bearings of the springs, as in locomotives.

One or more springs, E, may be placed beneath the principal springs A, to strengthen them.

The lengths of the adjusting-links C are intended to be such that when the ends of the springs A, to which they are suspended, strike the curved bearings, they will form a tangent to the circle of the bearings B.

The lines H indicate the base of the curved bearing, which may be supported in any suitable manner.

Having fully described the construction and operation of my invention,

What I claim, and desire to secure by Letters Patent, is—

1. The combination of the curved bearings B, springs A, suspended adjusting-links C, and connecting-bar D, when constructed and arranged so as to operate substantially as and for the purposes set forth.

2. The combination of the springs A A and the curved bearings B B, arranged to operate substantially as herein set forth, either with or without the suspended links C C and connecting-bar D, or either of them.

Witnesses:     ALLYN E. WOLCOTT.
LEWIS L. COBURN,
J. L. COBURN.